(12) United States Patent
Schug et al.

(10) Patent No.: US 10,573,324 B2
(45) Date of Patent: Feb. 25, 2020

(54) METHOD AND SYSTEM FOR BIT RESERVOIR CONTROL IN CASE OF VARYING METADATA

(71) Applicant: DOLBY INTERNATIONAL AB, Amsterdam, Zuidoost (NL)

(72) Inventors: Michael Schug, Erlangen (DE); Holger Hoerich, Fürth (DE); Tobias R. Wagenblass, Nürnberg (DE); Christof Fersch, Neumarkt (DE); Karsten Linzmeier, Nürnberg (DE)

(73) Assignee: Dolby International AB, Amsterdam Zuidoost (NL)

( * ) Notice: Subject to any disclaimer, the term of this patent is extended or adjusted under 35 U.S.C. 154(b) by 0 days.

(21) Appl. No.: 16/079,943

(22) PCT Filed: Feb. 1, 2017

(86) PCT No.: PCT/EP2017/052111
§ 371 (c)(1),
(2) Date: Aug. 24, 2018

(87) PCT Pub. No.: WO2017/144246
PCT Pub. Date: Aug. 31, 2017

(65) Prior Publication Data
US 2019/0080700 A1 Mar. 14, 2019

Related U.S. Application Data

(60) Provisional application No. 62/299,485, filed on Feb. 24, 2016.

(30) Foreign Application Priority Data
Feb. 24, 2016 (EP) .................................... 16157150

(51) Int. Cl.
*G10L 19/002* (2013.01)
*G06K 9/62* (2006.01)

(52) U.S. Cl.
CPC .......... *G10L 19/002* (2013.01); *G06K 9/6267* (2013.01)

(58) Field of Classification Search
None
See application file for complete search history.

(56) References Cited

U.S. PATENT DOCUMENTS 6,904,089 B1 6/2005 Sueyoshi
7,450,514 B2 11/2008 Suh
(Continued)

FOREIGN PATENT DOCUMENTS

EP 1420401 5/2004
JP 2004-252068 9/2004
(Continued)

OTHER PUBLICATIONS

Camberlein, E. et al "Optimal bit reservoir control for audio coding", IEEE workshop on Applications of Signal Processing to Audio and Acoustics, Oct. 16, 2005, pp. 251-254.
(Continued)

*Primary Examiner* — Mohammad S Adhami

(57) ABSTRACT

The present document describes a method (800) for allocating bits to a frame (301) of a sequence of frames (301) to yield a bitstream having a constant average bitrate, wherein the frame (301) comprises audio data and metadata. The method (800) comprises maintaining (801) an overall bit reservoir (100) and maintaining (802) a virtual bit reservoir (510) being a subset of the overall bit reservoir (100), such that bits for the metadata of the frame (301) are allocated
(Continued)

from the virtual bit reservoir (510) and such that bits for the audio data of the frame (301) are allocated from the overall bit reservoir (100).

10 Claims, 6 Drawing Sheets

(56) References Cited

U.S. PATENT DOCUMENTS

| | | | |
|---|---|---|---|
| 7,613,605 B2 | 11/2009 | Funakoshi | |
| 7,689,429 B2 | 3/2010 | Zhou | |
| 8,064,752 B1 | 11/2011 | Black | |
| 8,204,121 B2 | 6/2012 | Feng | |
| 8,259,735 B2 | 9/2012 | Gutman | |
| 8,311,843 B2 | 11/2012 | Dalimba | |
| 8,494,863 B2 | 7/2013 | Biswas | |
| 8,515,904 B1* | 8/2013 | Dwyer, III | G06F 21/6218 707/609 |
| 8,891,934 B2 | 11/2014 | Messmer | |
| 8,924,201 B2 | 12/2014 | Hedelin | |
| 8,938,387 B2 | 1/2015 | Hedelin | |
| 8,947,273 B2 | 2/2015 | Bartnik | |
| 9,070,351 B2 | 6/2015 | Kellett | |
| 2010/0169080 A1 | 7/2010 | Tsuchinaga | |
| 2011/0046966 A1* | 2/2011 | Dalimba | G10L 19/035 704/503 |
| 2013/0019053 A1 | 1/2013 | Somanache | |
| 2013/0159004 A1* | 6/2013 | Hoerich | G10L 19/00 704/500 |
| 2014/0133683 A1* | 5/2014 | Robinson | H04S 3/008 381/303 |
| 2014/0140400 A1 | 5/2014 | George | |
| 2014/0358554 A1* | 12/2014 | Riedmiller | G10L 19/002 704/500 |
| 2015/0025895 A1* | 1/2015 | Schildbach | G10L 19/16 704/500 |

FOREIGN PATENT DOCUMENTS

| | | |
|---|---|---|
| JP | 2005-003835 | 1/2005 |
| JP | 2010-182391 | 8/2010 |
| JP | 2013-045067 | 3/2013 |
| WO | 2014/113465 | 7/2014 |
| WO | 2014/113471 | 7/2014 |
| WO | 2014/204783 | 12/2014 |

OTHER PUBLICATIONS

Liu, Chi-Min, et al "Bit reservoir design for HE-AAC", Audio Engineering Society presented at the 118th Convention, Barcelona, Spain, May 28-31, 2005, pp. 1066-1073.

Liu, Chin-Min et al. "Efficient Bit Reservoir Design for MP3 and AAC", AES presented at the 117th Convention San Francisco: Oct. 2004, pp. 1-8.

* cited by examiner

METHOD AND SYSTEM FOR BIT RESERVOIR CONTROL IN CASE OF VARYING METADATA

TECHNICAL FIELD

The present document relates to the encoding of audio data. In particular, the present document relates to bit reservoir control for an average bit rate (ABR) audio coding system.

BACKGROUND

ABR audio coding systems are designed to allocate a variable amount of data to different temporal sections (notably frames) of audio data, while maintaining, in average, an overall constant bitrate. An ABR audio coding system makes use of a so called bit reservoir to achieve this goal. Typically side information or additional metadata is transmitted together with the core audio data within the same bitstream. The amount of additional metadata may vary over time, thereby impacting the bit allocation control mechanism for maintaining, in average, an overall constant bitrate.

The present document addresses the technical problem of providing an improved bit allocation scheme for ABR audio coding systems which encode varying amounts of metadata along with audio data. In particular, a bit allocation scheme is described, which improves the perceived audio quality of the encoded audio data in a temporally consistent manner, even in cases where varying amounts of metadata are to be encoded along with the audio data.

SUMMARY

According to an aspect, a method for allocating bits to a frame of a sequence of frames is described. The bits may be allocated such that a bitstream having a constant average bitrate is provided. The frame includes audio data and metadata. The frame may for example be an AC-4 data frame or a substream frame for a substream of an AC-4 audio program. In particular, the method may be directed at determining a number of audio bits which are available for encoding the audio data of the frame and at determining a number of metadata bits which are available for encoding the metadata of the frame. The number of audio bits and the number of metadata bits should be determined such that in average the sequence of encoded frames included within the bitstream exhibits the constant average bitrate.

The method includes maintaining an overall bit reservoir, wherein the overall bit reservoir may include the total number of bits which are available for encoding a frame of the sequence of frames. This total number of bits may be indicated by the overall fill level of the overall bit reservoir. Furthermore, the method includes maintaining a virtual bit reservoir being a subset of the overall bit reservoir. In other words, a virtual bit reservoir may be maintained as a separate entity within the overall bit reservoir.

The overall bit reservoir and the virtual bit reservoir are maintained such that bits for the metadata of a frame for the sequence of frames are allocated or granted from the virtual bit reservoir. Furthermore, the overall bit reservoir and the virtual bit reservoir are maintained such that bits for the audio data of the frame are allocated from the overall bit reservoir. In particular, the metadata of a frame may be encoded using only bits from the virtual bit reservoir (this may be the case for all frames of the sequence of frames). Furthermore, the audio data of a frame may be encoded using only bits from a residual bit reservoir being the complement of the virtual bit reservoir within the overall bit reservoir (this may be the case for all frames of the sequence of frames).

By maintaining a dedicated virtual bit reservoir for the metadata of a sequence of frames as a subset of an overall bit reservoir, the effects of temporal metadata fluctuations on the overall bit reservoir may be decoupled from the bit reservoir control used for the audio data. As a result of this, a consistent audio quality may be maintained, even in case of substantial metadata fluctuations.

The step of maintaining the overall bit reservoir may include, for the frame of the sequence of frames, increasing an overall fill level of the overall bit reservoir by an overall average-bits-per-frame value. The overall average-bits-per-frame value may be dependent on the constant average bitrate. In particular, the overall average-bits-per-frame value may be such that the sequence of encoded frames exhibits the constant average bitrate, if each encoded frame of the sequence of encoded frames is encoded with a number of bits equal to the overall average-bits-per-frame value. The step of maintaining the overall bit reservoir may further include, for the frame of the sequence of frames, granting available bits from the overall bit reservoir for the audio data of the frame in accordance with the overall fill level of the overall bit reservoir.

In a similar manner, the step of maintaining the virtual bit reservoir may include, for the frame of the sequence of frames, increasing a virtual fill level of the virtual bit reservoir by a virtual average-bits-per-frame value, wherein the virtual average-bits-per-frame value is a portion of the overall average-bits-per-frame value. The virtual average-bits-per-frame value may be used to define the portion of the constant average bitrate, which is assigned to the metadata. Furthermore, the step of maintaining the virtual bit reservoir may include, for the frame of the sequence of frames, granting available bits from the virtual bit reservoir for the metadata of the frame in accordance with the virtual fill level of the virtual bit reservoir. The number of bits granted to the metadata may be limited by the virtual fill level of the virtual bit reservoir in order to prevent an underflow of the virtual bit reservoir and in order to limit the bitrate of metadata within the bitstream.

As such, the virtual bit reservoir and a residual bit reservoir (given as the complement of the virtual bit reservoir within the overall bit reservoir) may be maintained separately to ensure a consistent allocation of bits for the audio data, even in case of metadata fluctuations.

The method may include determining whether the virtual fill level is smaller than or equal to a low fill level threshold, subsequent to granting available bits for the metadata of the frame. The low fill level threshold may for example correspond to an empty virtual bit reservoir. Furthermore, the method may include increasing the virtual average-bits-per-frame value, if it is determined that the virtual fill level is smaller than or equal to the low fill level threshold. The virtual average-bits-per-frame value may be increased by a pre-determined delta value. When increasing the virtual average-bits-per-frame value, the fraction of the overall average bitrate that is attributed to the metadata is increased. As such, the method may enable an automatic adaption of the parameters of the virtual bit reservoir to the actual requirements of the sequence of frames.

The method may include determining whether the virtual fill level is greater than or equal to a high fill level threshold, subsequent to increasing the virtual fill level of the virtual bit reservoir. The high fill level threshold may for example correspond to the virtual reservoir size of the virtual bit reservoir. As such, an overflow of the virtual bit reservoir may be detected. Furthermore, the method may include decreasing the virtual average-bits-per-frame value, if it is determined that the virtual fill level is greater than or equal to the high fill level threshold. As a result of this, the fraction of the overall average bitrate that is attributed to the metadata is decreased. Hence, the method may enable an automatic adaption of the parameters of the virtual bit reservoir to the actual requirements of a sequence of frames.

An overflow bit from the virtual bit reservoir may be made available within the residual bit reservoir (for the audio data). Alternatively or in addition, an overflow bit from the residual bit reservoir may be made available within the virtual bit reservoir. By doing this, the overall coding efficiency may be increased, because the number of fill-bits within the bitstream may be reduced.

The virtual bit reservoir typically exhibits a virtual reservoir size which is indicative of a maximum number of bits that can be granted for the metadata of a single frame of the sequence of frames. The method may include determining whether the virtual fill level would be greater than the virtual reservoir size, subsequent to increasing the virtual fill level of the virtual bit reservoir by the virtual average-bits-per-frame value. Furthermore, the method may include, setting the virtual fill level to the virtual reservoir size, if it is determined that the virtual fill level would be greater than the virtual reservoir size. The one or more bits exceeding the virtual reservoir size may be used to increase the fill level of the residual bit reservoir, such that these one or more bits may be allocated to the audio data. By doing this, the overall coding efficiency may be increased.

The step of granting available bits from the overall bit reservoir or from the residual bit reservoir to the audio data of a frame may include determining a bit allocation control function, which indicates a value of bits from the overall bit reservoir and/or the residual bit reservoir, which is to be granted for (encoding) the audio data of the frame, as a function of the fill level of the respective bit reservoir. Typically, the bit allocation control function increases with increasing overall fill level. The bit allocation control function may be dependent on a degree of encoding difficulty of the audio data of the frame, wherein the bit allocation control function typically increases with increasing degree of encoding difficulty. Available bits from the overall bit reservoir and/or from the residual bit reservoir may be granted for encoding the audio data of the frame using the bit allocation control function. By doing this, a consistent audio quality may be achieved, while at the same time preventing an overflow and/or underflow of the overall bit reservoir and/or of the residual bit reservoir.

The step of granting available bits from the virtual bit reservoir for the metadata may include determining whether a number of bits required for the metadata of the frame is higher than a bit threshold, wherein the bit threshold is dependent on the virtual fill level. In particular, the bit threshold may correspond to or may be equal to the virtual fill level. Alternatively, the bit threshold may be higher than the virtual fill level. By way of example, the bit threshold may correspond to $l_{evo}+p*(l-l_{evo}-minBitsAudio)$, wherein $l_{evo}$ is the virtual fill level, l is the overall fill level, minBitsAudio is a reserved number of bits for encoding the audio data, and p is a parameter between 0 and 1. Such an increased bit threshold enables the use of at least some of the bits from the residual bit reservoir for encoding metadata (for example, for encoding peaks of metadata).

The method may include discarding at least some of the metadata of the frame (for example low priority metadata), if the number of bits required for the metadata is higher than the bit threshold. By doing this, it may be ensured that the metadata does not exceed pre-determined limits regarding an average bitrate and/or a maximum number of bits per frame.

The frame of the sequence of frames may be referred to as a current frame which is received at a first time instant. Due to processing delays, the actual bit allocation for the current frame may only occur at a second time instant which is subsequence to the first time instant. In particular, a time interval between the first time instant and the second time instant may correspond to n frames, with n being equal to or greater than 1.

The method may include predicting a virtual fill level of the virtual bit reservoir at the second time instant, at which bits for the current frame are to be allocated. Furthermore, the method may include determining, at the first time instant, whether a number of bits required for the metadata of the current frame is higher than a bit threshold, wherein the bit threshold is dependent on the predicted virtual fill level at the second time instant. By predicting the virtual bit reservoir fill level, a decision regarding the encoding of metadata may be made at the first time instant and therefore prior to the second time instant. As a result of this, a user may be informed at an early stage on whether encoding of metadata is possible or not.

The method may include determining a number of reserved bits which is to be used for encoding the metadata of the n frames preceding the current frame. Furthermore, the method may include determining the virtual fill level at the first time instant. The virtual fill level at the second time instant may then be predicted based on the virtual fill level at the first time instant and based on the number of reserved bits. Furthermore, the method may include determining a number of overflow bits which arise within the virtual bit reservoir for encoding the metadata of the n frames preceding the current frame. The virtual fill level at the second time instant may then be predicted also based on the number of overflow bits. In particular, the virtual fill level at the second time instant may be predicted as $l_n = l_0 - \Sigma_{i=1}^{n}(\mu_i + f_i) + n \cdot a$, with $l_0$ being the virtual fill level at the first time instant, with $\mu_i$ being the number of reserved bits for the $i^{th}$ frame preceding the current frame, with $f_i$ being the number of overflow bits for the $i^{th}$ frame preceding the current frame, with $i=1, \ldots, n$, and with a being the virtual average-bits-per-frame value. As such, the virtual fill level at the second time instant may be predicted in a precise manner.

Bits from the virtual bit reservoir may be used to encode high priority metadata. In particular, the virtual bit reservoir may be reserved for the allocation of bits to high priority metadata. The number of overflow bits which arise within the virtual bit reservoir for encoding the high priority metadata of the n frames preceding the current frame may be used for encoding low priority metadata. By doing this, metadata may be included within the bitstream in a flexible and robust manner. Alternatively, the number of overflow bits from the virtual bit reservoir may be transferred to the residual bit reservoir. As such, the overflow bits from the virtual bit reservoir may be used for encoding audio data.

The method may include classifying the metadata into high priority metadata and low priority metadata. Low priority metadata may be discarded, if the number of bits required for encoding the metadata is higher than the bit threshold. On the other hand, high priority metadata may be encoded, if the number of bits required for encoding the high priority metadata is lower than or equal to the bit threshold.

The audio data of a frame of the sequence of frames may be encoded using bits from the residual bit reservoir being the complement of the virtual bit reservoir within the overall bit reservoir. The residual bit reservoir may exhibit a residual fill level given by the overall fill level minus the virtual fill level. In particular, the audio data of a frame of the sequence of frames may be encoded using bits from a second virtual bit reservoir being a subset of the residual bit reservoir or being equal to the residual bit reservoir. The second virtual bit reservoir may exhibit a second virtual fill level being a portion of or being equal to the residual fill level. As such, a plurality of virtual bit reservoirs may be maintained within the overall bit reservoir for different types of data of the frames of a sequence of frames. In particular, the method may comprise maintaining a plurality of virtual bit reservoirs as mutually disjoint subsets of the overall bit reservoir. The plurality of virtual bit reservoirs may be used for (encoding) a plurality of different types of metadata. By way of example, a first virtual bit reservoir may be maintained for the high priority metadata and a second virtual bit reservoir may be maintained for the audio data.

As already indicated above, the overall bit reservoir typically exhibits an overall reservoir size which is indicative of a maximum number of bits that can be allocated to a frame of the sequence of frames. The overall average-bits-per-frame value may be indicative of an average number of bits that can be allocated to a frame of the sequence of frames to achieve the constant average bitrate. The overall reservoir size may be N times the overall average-bits-per-frame value, with N being greater than one. By way of example, N is equal to 3, 4, 5, 6 or more, wherein N does not necessarily need to be an integer. Such parameters allow for a robust encoding of a sequence of frames for yielding a bitstream having a constant average bitrate.

In a similar manner, the virtual bit reservoir typically exhibits a virtual reservoir size which is indicative of a maximum number of bits that can be allocated to the metadata of a frame of the sequence of frames. The virtual average-bits-per-frame value may be indicative of an average number of bits that can be allocated to the metadata of a frame of the sequence of frames. The virtual reservoir size may be M times the virtual average-bits-per-frame value, with M being greater than one. By way of example, M is equal to 2, 3, 4, 5, 6 or more, wherein N does not necessarily need to be an integer. Such parameters allow for a robust encoding of a sequence of frames having substantial fluctuations of metadata.

The overall bit reservoir may be refilled with the overall average-bits-per-frame value for every frame of the sequence of frames. In a similar manner, the virtual bit reservoir may be refilled with the virtual average-bits-per-frame value for every frame of the sequence of frames. The method may include setting a parameter of an audio encoder for encoding the audio data of the frame of the sequence of frames in dependence of the virtual average-bits-per-frame value. In particular, the parameter of the audio encoder may be set in dependence of a residual average-bits-per-frame value which is given by the overall average-bits-per-frame value minus the virtual average-bits-per-frame value. By way of example, the parameter of the audio encoder may be changed, subject to a change of the virtual average-bits-per-frame value and/or the residual average-bits-per-frame value. The parameter of the audio encoder may include: a bitrate dependent parameter of a psychoacoustic model used by the audio encoder; and/or a bitrate dependent threshold of the audio encoder. As such, a dynamic adaption of the audio encoder to the available average bitrate for audio data may be performed, thereby increasing the quality of the encoded audio data.

According to a further aspect, a method for encoding a frame of a sequence of frames into a bitstream having a constant average bitrate is described, wherein the frame includes audio data and metadata. The method includes determining a granted number of audio bits for the audio data and a number of metadata bits for the metadata, using the bit allocation method described in the present document. Furthermore, the method includes encoding the metadata of the frame using the granted number of metadata bits and encoding the audio data of the frame using the granted number of audio bits.

The frame of the sequence of frames may include a plurality of substream frames for a plurality of substreams, respectively. A substream frame may include substream audio data and substream metadata. The method may include determining a granted number of audio bits for the substream audio data and a number of metadata bits for the substream metadata, using the bit allocation method described in the present document. In particular, bit allocation may be performed on a per-substream basis such that each substream exhibits a certain constant average bitrate. By doing this, efficient bit allocation may be achieved for complex audio programs including a plurality of substreams.

A frame of the sequence of frames may include joint metadata for the plurality of substreams. The method may include distributing the joint metadata as substream metadata to at least one of the plurality of substreams.

According to further aspect, a system for allocating bits to a frame of a sequence of frames is described to yield a bitstream having a constant average bitrate. The frame includes audio data and metadata. The system includes a processor which is configured to maintain an overall bit reservoir and to (notably separately) maintain a virtual bit reservoir being a subset of the overall bit reservoir, such that bits for the metadata of the frame are allocated from the virtual bit reservoir and such that bits for the audio data of the frame are allocated from a residual bit reservoir being the complement of the virtual bit reservoir within the overall bit reservoir.

According to a further aspect, a system for encoding a frame of a sequence of frames into a bitstream having a constant average bitrate is described, wherein the frame includes audio data and metadata. The system includes a processor which is configured to determine a granted number of audio bits for the audio data and a number of metadata bits for the metadata using the bit allocation method described in the present document. Furthermore, the processor is configured to encode the metadata of the frame using the granted number of metadata bits and to encode the audio data of the frame using the granted number of audio bits.

According to a further aspect, a software program is described. The software program may be adapted for execution on a processor and for performing the method steps outlined in the present document when carried out on the processor.

According to another aspect, a storage medium is described. The storage medium may include a software program adapted for execution on a processor and for performing the method steps outlined in the present document when carried out on the processor. For example, the present document describes a non-transitory computer-readable medium with instructions stored thereon that when executed by one or more processors perform the method steps outlined in the present document.

According to a further aspect, a computer program product is described. The computer program may include executable instructions for performing the method steps outlined in the present document when executed on a computer.

It should be noted that the methods and systems including its preferred embodiments as outlined in the present patent application may be used stand-alone or in combination with the other methods and systems disclosed in this document. Furthermore, all aspects of the methods and systems outlined in the present patent application may be arbitrarily combined. In particular, the features of the claims may be combined with one another in an arbitrary manner.

SHORT DESCRIPTION OF THE FIGURES

Through the following detailed description with reference to the accompanying drawings, the above and other objectives, features and advantages of the example embodiments will become more comprehensible. In the drawings, several examples will be illustrated in non-limiting manner, wherein.

DETAILED DESCRIPTION

In contrast to (audio-) coding/decoding systems, referred to as codecs, with a constant number of bits per frame (referred to as a constant frame size) like for example AC-3, the AC-4 codec includes a bit reservoir (also referred to as bit buffer) allowing a variable number of bits per frame (referred to as a variable frame size), while on average yielding a constant bitrate. With such an average bitrate (ABR) coding mode, difficult-to-encode audio frames may use more bits compared to adjacent easy-to-encode frames, thereby increasing the overall audio quality compared to a constant bitrate (CBR) approach with a fixed frame size (meaning with a fixed number of bits per frame). In the present document an encoder bit reservoir control scheme for ABR coding systems is described that reduces (for example minimizes) the impact of varying amounts of additional metadata on the audio quality.

The terms used in the present document may be understood as follows:
- a bit buffer or a bit reservoir may be understood as a buffer comprising the bits which are available for encoding one or more frames of a sequence of frames (for example for encoding AC-4 data);
- the bit reservoir size may be understood as being the maximum number of bits that are made available within the bit buffer; by way of example, the bit buffer size may correspond to N times (for example N=6) the average-bits-per-frame value;
- the average-bits-per-frame value may be understood as being a number of bits, which represents or which corresponds to the average bitrate of the target bitstream;
- the used bits for a current frame may be understood as being the size of (meaning, being the number of bits used for encoding) the current frame;
- the granted bits of a current frame may be understood as being the number of bits that the bit reservoir control allows to be used for encoding the current frame; the used bits for the current frame may not exactly be equal to the granted bits for the current frame, however, both values are typically relatively close to one another;
- the level, the fill level or the bit reservoir fullness may be understood as indicating the number of bits that are currently available within in the bit reservoir.

An encoder bit reservoir control is typically directed at exploiting the bit reservoir for variations of the number of used bits for the different frames of a sequence of frames, in such a way that
- difficult-to-encode frames are allocated a higher number of bits than an average or easy-to-encode frame; and
- the average bitrate remains constant by avoiding an over- and underrun of the bit reservoir.

Figure 1:
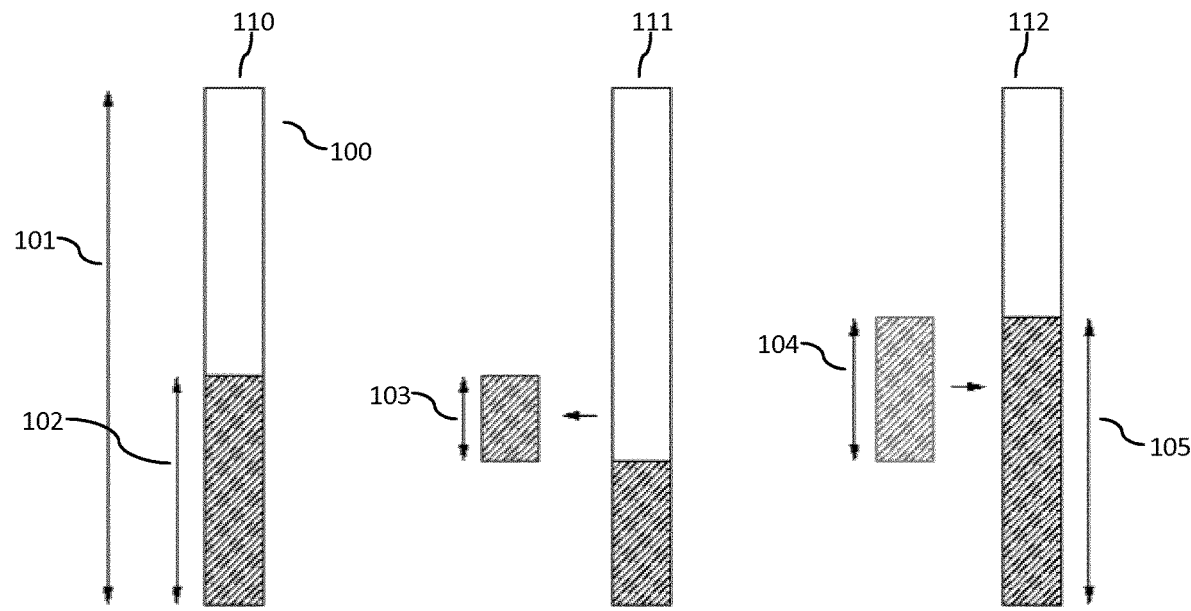
FIG. 1 shows different states of an example bit reservoir.

In FIG. 1 three states 110, 111, 112 of the encoder bit reservoir 100 during the encoding process of an $n^{th}$ frame are shown. The buffer 100 exhibits a bit reservoir size 101. In a first state 110 the bit reservoir 100 includes a fill level 102 of bits which are available for encoding the $n^{th}$ frame. The encoder bit reservoir control decides on how many of these available bits are taken out of the bit reservoir 100 in order to encode the $n^{th}$ frame. These used bits 103 are used for encoding the $n^{th}$ frame and will be written to the bitstream (state 111). In a third state 113 a number 104 of bits corresponding to the average bitrate are added to the bit reservoir 100, thereby providing an updated bit reservoir fill level 105 that is available for encoding the $(n+1)^{th}$ frame. The number 104 of bits which is used for increasing the fill level 105 of the bit reservoir 100 is referred to as average-bits-per-frame value.

The encoder bit reservoir control takes into account the following two conditions to fulfill the bit reservoir requirements:
1. the used bits 103 for encoding a frame cannot be higher than the current fill level 102 (in order to avoid bit reservoir underflow); and
2. the used bits 103 should be sufficiently high, such that after adding the average-bits-per-frame value 104 of bits to the bit reservoir 100, the bit reservoir fill level 105 does not exceed the bit reservoir size 101 (in order to avoid buffer overflow). In such a case fill bits would be written to the bitstream (to account for the excessive number of bits), which may lead to a limitation of the achievable audio quality.

Figure 2:
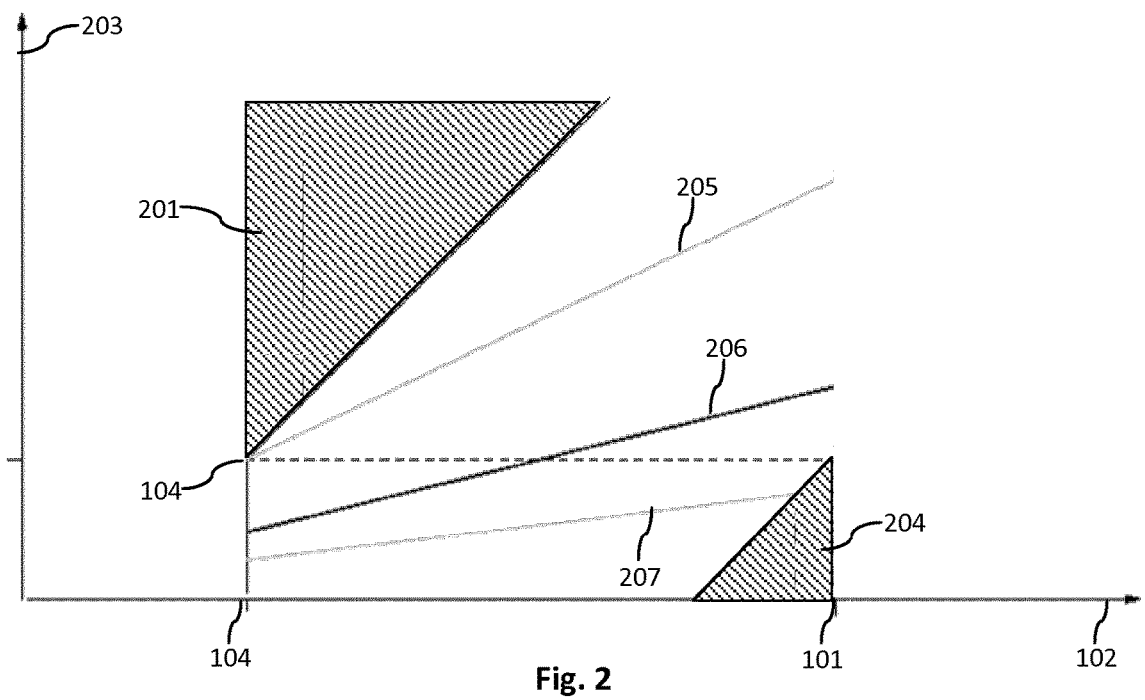
FIG. 2 shows example bit allocation control functions.

FIG. 2 illustrates a bit reservoir control scheme that fulfills the above requirements. In the graph the granted bits 203 for a current frame n, as allocated by the bit buffer control scheme, are shown as a function of the bit reservoir fill level 102. The granted bits 203 determine the amount of bits that is allowed to be taken out of the bit reservoir 100 for the current frame n. The granted bits 203 typically correspond (e.g. are equal to) the used bits 103 of FIG. 1. Typically, the used bits 103 should not be greater than the granted bits 203. However, the presence of the bit reservoir 100 allows for (typically small) mismatches between the granted bits 203 and the used bits 103, as long as it is guaranteed that the above mentioned bit reservoir requirements are not violated. Such a pragmatic approach may be useful for providing an encoder with reduced computational complexity (as it allows decoupling bit allocation from actual encoding).

FIG. 2 shows different, fill level dependent, control functions 205, 206, 207 for frames with different degrees of encoding difficulty. Notably FIG. 2 shows control functions 205, 206, 207 for a relatively high difficulty, an average difficulty and a relatively low difficulty, respectively. The control functions 205, 206, 207 indicate how many bits may be granted for the encoding of a current frame, in dependence of the current fill level 102 of the bit reservoir 100. Furthermore, FIG. 2 shows a first region 201 which is not allowed as it would lead to a bit reservoir underflow and a second region 204 which is not allowed as it would lead to a bit reservoir overflow and/or to the insertion of fill-bits within the bitstream.

The slope of the control functions 205, 206, 207 indicates that relatively less bits are granted in case of a relatively empty bit reservoir 100 and that relatively more bits are spent in case of a relatively full bit reservoir 100. In particular, for a frame with average difficulty, the control function 206 is below the average-bits-per-frame value 104 in case of a relatively empty bit reservoir 100 and above the average-bits-per-frame value 104 in case of a relatively full bit reservoir 100. Over time such a control function 206 will lead to an average bit reservoir fill level 102 at the intersection of the control function 206 and the average-bits-per-frame value 104. In case of difficult frames, the control function 205 is scaled upwards resulting in granting an increased number of bits and resulting in a reduced bit reservoir fill level 102. On the other hand, for relatively easy-to-encode frames, the control function 207 is scaled downwards. By selecting the slope and the height of the control functions 205, 206, 207 (notably the control lines), a smooth operation of the bit reservoir 100 may be achieved, meeting the above mentioned control requirements for the bit reservoir 100.

As outlined above, a to-be-encoded frame may include audio data and metadata. The bit allocation may be performed jointly, once per frame, for determining granted bits 203 that are available for encoding both, the audio data and the metadata of a frame. As such, the granted bits value 203 may indicate the amount of bits to be used for an entire AC-4 frame, including metadata and audio data.

The number of bits, which is required for encoding a certain portion of a frame, may already be known and possibly fixed. In the case of an AC-4 frame, this may include: the table of contents (TOC); parametric audio coding tool data like ASPX (Advanced spectral extension), ACPL (Advanced coupling) and companding; selected metadata; alignment bits and/or control bits of the spectral frontend, for example of the MDCT (Modified Discrete Cosine Transform), of the encoder. These bits may be referred to as static bits. On the other hand, a variable number of bits is typically required for encoding the spectral data from the spectral frontend of the audio encoder (notably the MDCT coefficients of an audio frame). These bits may be referred to as dynamic bits.

Figure 3:
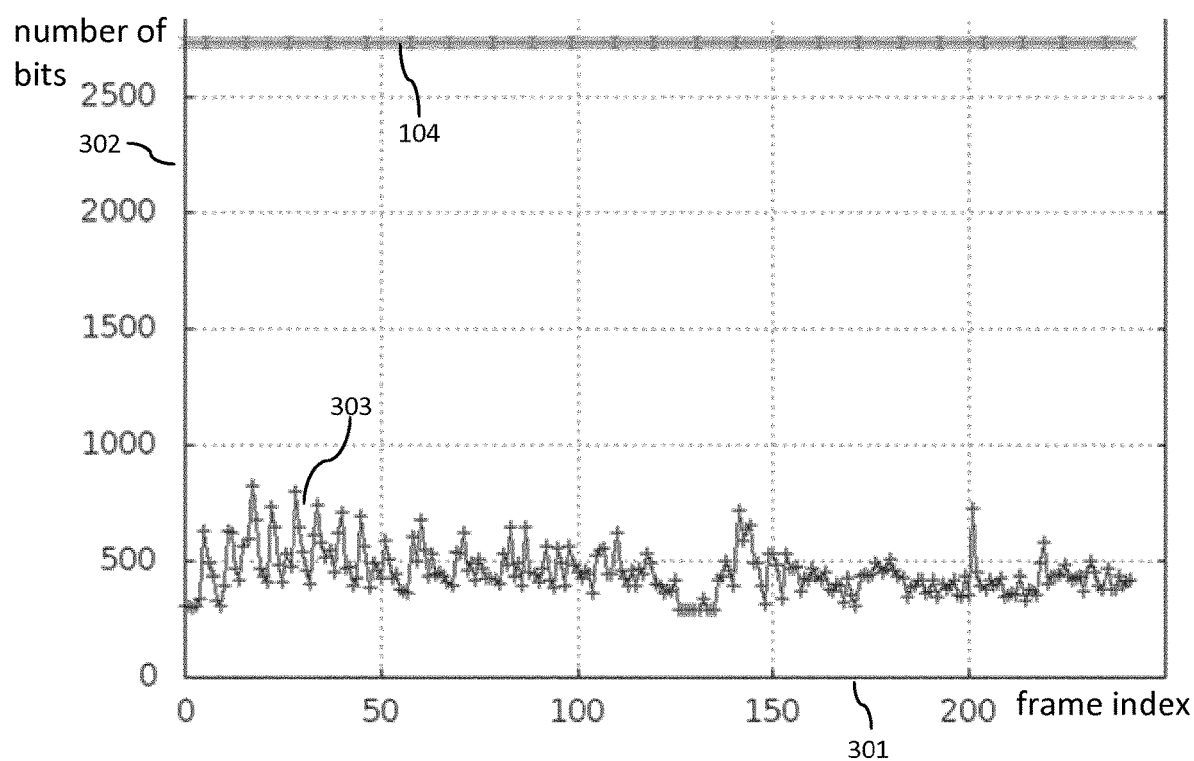
FIG. 3 shows an example distribution of metadata within a sequence of frames.

The number of static bits may be relatively small compared to the number of dynamic bits (e.g. 20%, 10% or less of the granted bits value 203 for a frame). Furthermore, if it is assumed that the number of static bits is roughly constant over time, it may be sufficient to subtract the number of static bits from the granted bits value 203, in order to determine the number of bits which are available as dynamic bits. In FIG. 3 a typical distribution of static bits 303 is shown for a sequence of frames 301. The x-axis indicates a sequence number or index of the frames 301 and the y-axis indicates the number of bits per frame 301. In the illustrated example, the frame index goes from 1 to 250 in integer steps of one. A frame typically corresponds to a particular temporal excerpt of an audio signal (e.g. of a 20 ms excerpt of an audio signal). The number of bits goes from 1 to 2500 in integer steps of one. In case of a 64 kbit/s stereo encoded AC-4 frame, the static bits 301 typically consume in average around 20% of the average-bits-per-frame value 104, however, varying between around 10% up to 30%. These variations typically lead to an undesirable ripple of the remaining number of bits 302, which is available for encoding the audio data and/or for encoding the dynamic bits, thereby leading to variations of the quality of the encoded audio data.

A bit reservoir control scheme may take into account the fluctuations of static bits 303 (used for encoding metadata) when allocating bits for the dynamic bits. In particular, it may be desirable to allocate a substantially constant amount of bits as dynamic bits (used for encoding audio data) for frames having a substantially equal degree of difficulty, once the bit reservoir fill level 102 has reached a steady state, regardless possibly fluctuations of the static bits 303. If this is achieved, a consistent perceptual audio quality may be provided.

Figure 4A:
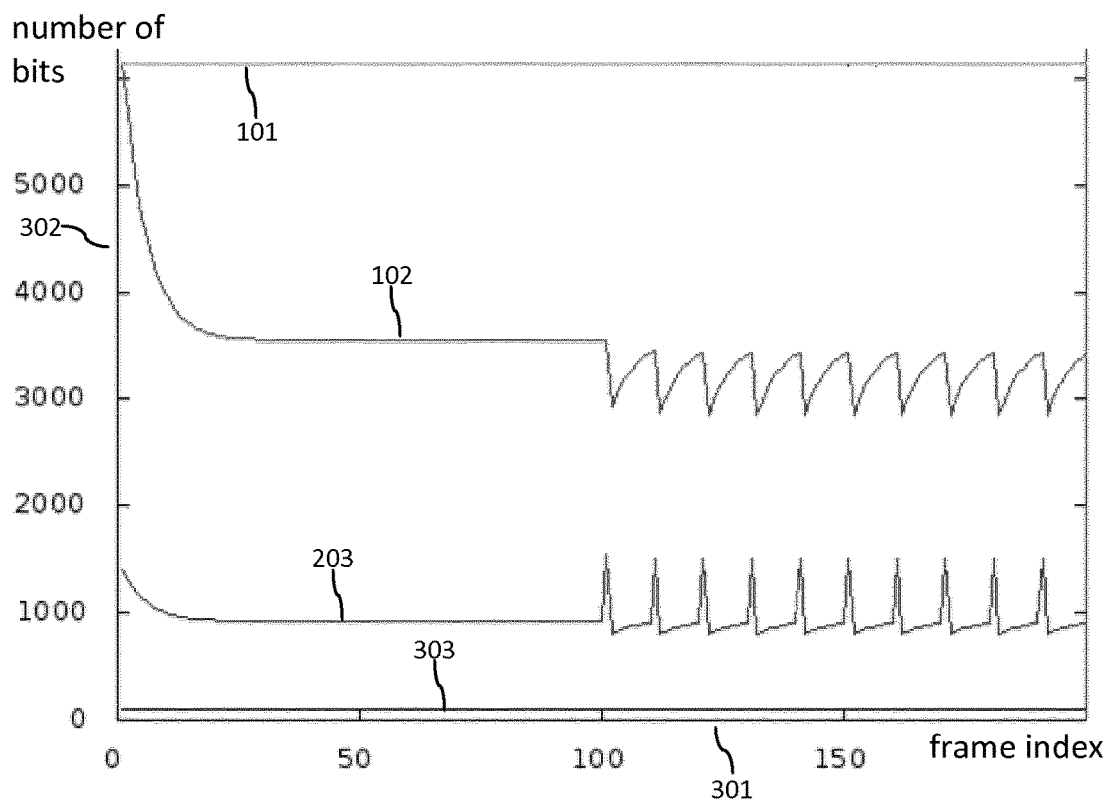
FIGS. 4a and 4b show example numbers of granted bits for encoding the frames of a sequence of frames.

FIG. 4a shows a bit reservoir control simulation with the above mentioned behavior for the first hundred frames 301 of a sequence of frames comprising two hundred frames 301. The x-axis indicates a sequence number of the frames 301 and the y-axis indicates a number of bits 302. In the illustrated example, the frame index goes from 1 to 200 in integer steps of one. The number of bits goes from 1 to 6000 in integer steps of one. In the first half of the simulation depicted in FIG. 4a, the to-be-encoded frames 301 all have an average degree of difficulty. In the second half of the simulation, every tenth frame 301 has a relatively increased degree of difficulty, as may be the case for a transient portion of audio data. The increased degree of difficulty leads to the allocation of an increased number of bits 302 (meaning an increased granted bits value 203) for the particular frame, and to the allocation of a slightly reduced number of bits 302 for a number of frames following the particular frame with the increased difficulty (due to the reduced fill level 102 of the bit reservoir 100).

In the simulation of FIG. 4a, the number of static bits 303 is constant over time and represents a relatively small percentage of the bit reservoir size 101. In typical applications, the static bits 303 vary. Such variations may be quite substantial, if additional metadata, also referred to as evolution metadata, is added to a bitstream (for example, for encoding information regarding an audio program). Such additional metadata may be distributed unequally over different frames. By way of example, grid data may be inserted into the bitstream, which includes substantial metadata payload in a periodic manner.

Figure 4B:
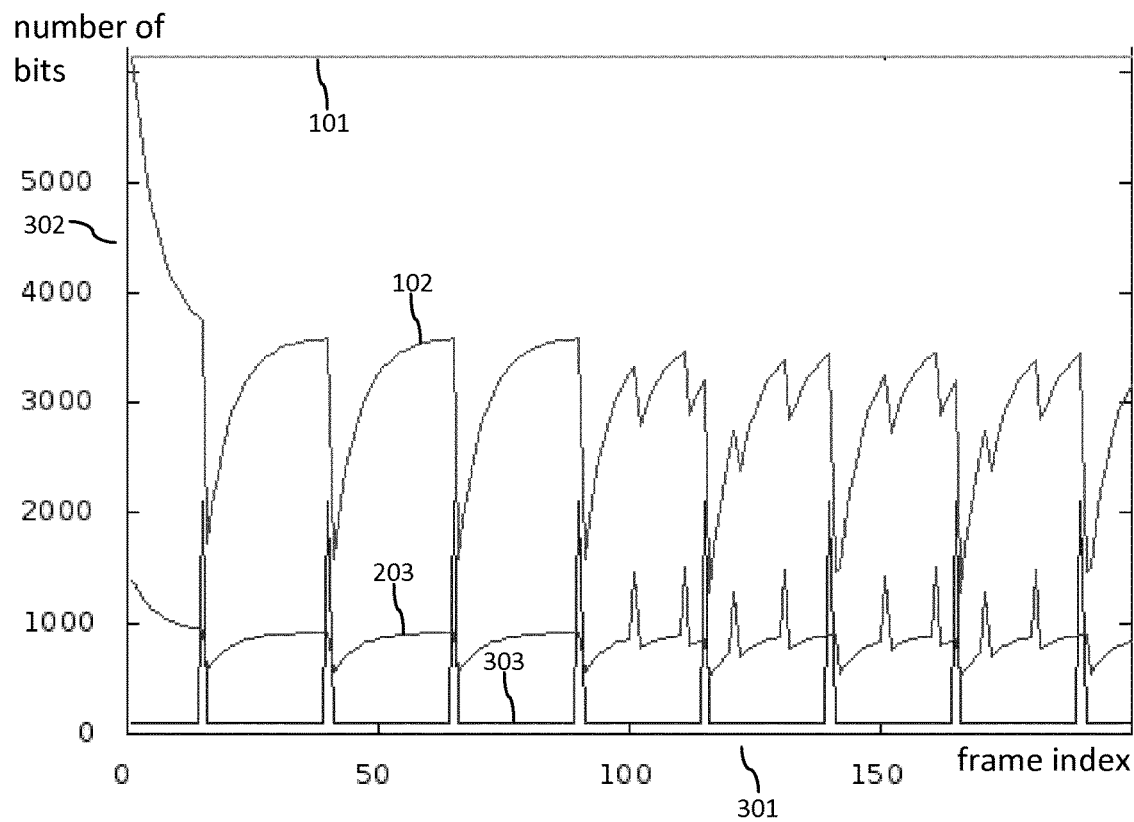

FIG. 4b shows simulation results for a situation which is similar with the one of FIG. 4a, however with additional metadata (that is, with additional static data 303) being added every $25^{th}$ frame 301. The x-axis indicates a sequence number of the frames 301 and the y-axis indicates a number of bits 302. In the illustrated example, the frame index goes from 1 to 200 in integer steps of one. The number of bits goes from 1 to 6000 in integer steps of one. It can be seen that as a result of the periodic insertion of additional static data 303, the granted bits value 203 for the dynamic bits (that is, for the audio data) decreases in a corresponding periodic manner, even though the to-be-encoded frames have a constant degree of difficulty within the first half of the simulation. Hence, the goal of allocating an equal amount of bits 302 per frame 301 for encoding the audio data can no longer be achieved due to the periodic drop of the bit reservoir fill level 102, which is caused by the periodic increase of to-be-encoded metadata. Moreover, in the second half of the simulation (where frames within increased degrees of encoding difficulty are inserted), some of the difficult-to-encode frames are not encoded with an increased number of bits (due to the substantially reduced bit reservoir fill level 102).

Hence, the variations of the amount of metadata, which is to be encoded, may impact the amount of bits which are available for encoding the audio data, thereby leading to an inconsistent perceptual quality of the encoded audio data.

The above mentioned drawbacks may be addressed by providing a virtual bit reservoir for static bits and/or for metadata. By splitting up the overall bit reservoir 100 into two virtual bit reservoirs for audio data and for metadata, respectively, the influence of rapid changes in the amount of metadata may be decoupled from the requirements for encoding the audio data.

The expected average number of static bits per frame and the expected maximum number bits which may be required for encoding metadata may be known at the initialization of an encoder. These values may be determined experimentally or may be set as requirements for to-be-encoded data. The values may be used for initializing the virtual bit reservoir for the metadata. However, in order to increase the robustness of the virtual bit reservoirs with regards to deviations from the initialization values, an adaptation of the parameters of the virtual bit reservoirs (such as bit reservoir size and average-bits-per-frame values) may be applied, notably in order to avoid wasting bits when the virtual bit reservoir for the metadata is full.

Furthermore, it may be beneficial to being able to react quickly to a relatively increased bit demand for metadata. This may be achieved by maintaining a joint virtual bit reservoir for static bits and/or for additional metadata, such as additional evolution metadata, a parametric audio coding tool or i-frames.

Figure 5A:
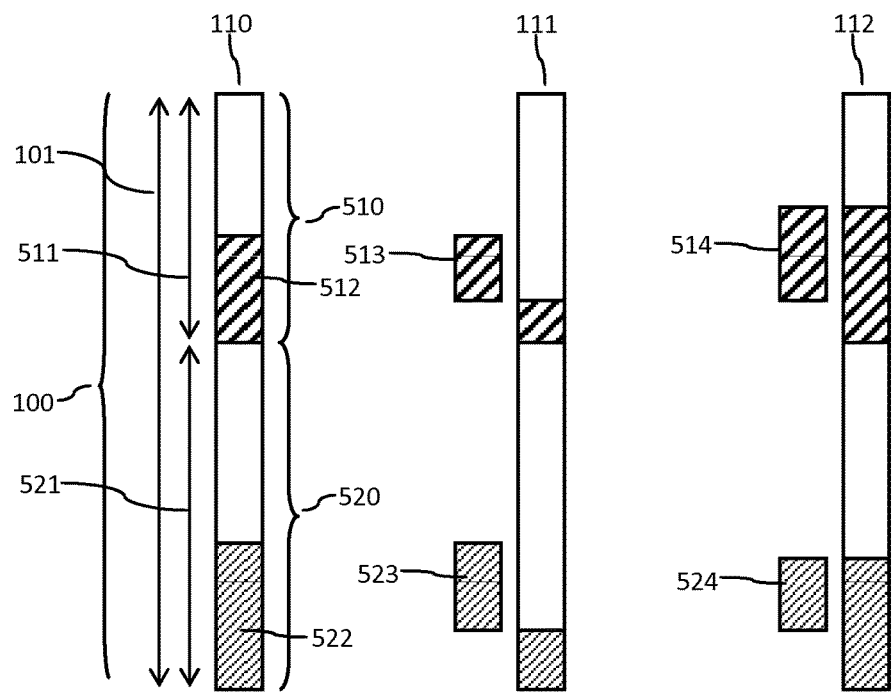
FIGS. 5a and 5b show different states of an example virtual bit reservoir.

FIG. 5a illustrates a bit allocation scheme which splits up an overall bit reservoir 100 with an overall bit reservoir size 101 into a first virtual bit reservoir 510 having a first bit reservoir size 511 and a second virtual bit reservoir 520 having a second bit reservoir size 521. The first virtual bit reservoir 510 may be used for allocating bits for encoding static data and/or metadata and the second virtual bit reservoir 520 may be used for encoding audio data. For encoding an $n^{th}$ frame which includes metadata and audio data, the virtual bit reservoirs 510, 520 exhibit a first fill level 512 and a second fill level 522, respectively. Depending on the requirements and/or the degree of difficulty, a first granted bit value 513 is determined for encoding the metadata and a second granted bit value 523 is determined for encoding the audio data. Subsequently, a first average-bits-per-frame value 514 is added to the first virtual bit reservoir 510 and a second average-bits-per-frame value 524 is added to the second virtual bit reservoir 520 for providing updated fill levels 512, 522 for encoding the subsequent $(n+1)^{th}$ frame.

The bit reservoir sizes 511, 521 and/or the average-bits-per-frame values 514, 524 may be determined experimentally. Typically, the bit reservoir size 511, 521 of a virtual bit reservoir 510, 520 is N times (for example N=6) the average-bits-per-frame value 514, 524 of the virtual bit reservoir 510, 520. It should be noted that the bit reservoir size 511, 521 may be different for the different virtual bit reservoirs 510, 520. If during the encoding of the metadata of the $n^{th}$ frame a bit reservoir overflow of the first virtual bit reservoir 510 occurs, the exceeding number of bits may be attributed to the second virtual bit reservoir 520 for increasing the second fill level 522 which is available for encoding the audio data of the $n^{th}$ frame. By doing this, fill bits for metadata may be avoided, thereby increasing the overall perceptual quality of the encoded audio data.

Furthermore, the bit reservoir sizes 511, 521 and/or the average-bits-per-frame values 514, 524 may be adapted during operation of the encoder. By way of example, a bit reservoir overflow of the first virtual bit reservoir 510 subsequent to encoding the metadata of the $n^{th}$ frame may trigger a decrease of the first average-bits-per-frame value 514 which is to be used for subsequent frames. The first average-bits-per-frame value 514 may be decreased by a pre-determined delta bit value. At the same time, the first bit reservoir size 511 may be decreased to N times the updated first average-bits-per-frame value 514. Furthermore, the second average-bits-per-frame value 524 and the second bit reservoir size 524 may be increased accordingly (by the delta bit value and by N times the delta bit value, respectively). The above mentioned adaption scheme may work accordingly, if a bit reservoir overflow of the second virtual bit reservoir 520 occurs.

An underflow or an empty second virtual bit reservoir 520 subject to granting bits for encoding the audio data of the $n^{th}$ frame may trigger an increase of the second average-bits-per-frame value 524 by the delta bit value (and possibly an increase of the second bit reservoir size 521 by N times the delta bit value). As the same time, the first average-bits-per-frame value 514 and possibly the first bit reservoir size 511 may be decreased accordingly. This adaption scheme may work accordingly, if a bit reservoir underflow or emptiness of the first virtual bit reservoir 510 occurs.

By using the above mentioned adaption methods, the bit allocation scheme may automatically adapt one or more parameters of the virtual bit reservoirs 510, 520 (notably the bit reservoir size and/or the average-bits-per-frame value) to the characteristics of the to-be-encoded data (comprising metadata and audio data), thereby providing a robust bit allocation scheme.

Figure 5B:
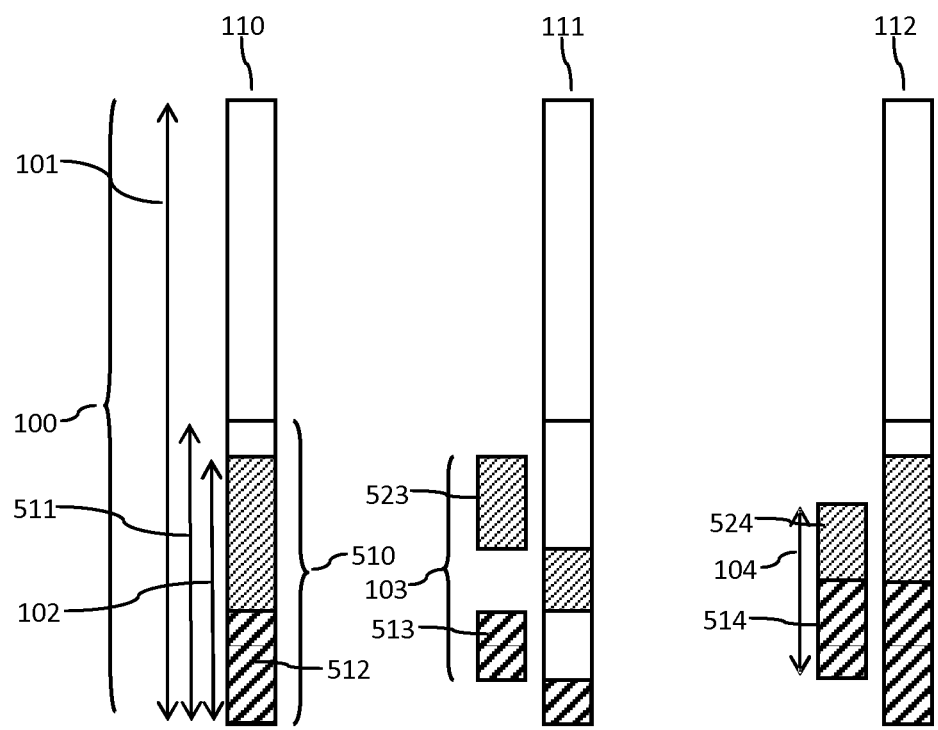

FIG. 5b shows an alternative way for managing a virtual bit reservoir 510 for the metadata and a virtual bit reservoir for the audio data. According to the implementation of FIG. 5b, the first virtual bit reservoir 510 (for the metadata) is a virtual bit reservoir within the overall bit reservoir 100. The overall bit reservoir 100 is defined by an overall bit reservoir size 101, an overall fill level 102 and an overall average-bits-per-frame value 104. Furthermore, the (first) virtual bit reservoir 510 is defined by a virtual bit reservoir size 511, a virtual fill level 512 and a virtual average-bits-per-frame value 514. The parameters of the second virtual bit reservoir 520 for the audio data may be given by the respective complements, meaning that the second bit reservoir size 521 may correspond to the overall bit reservoir size 101 minus the virtual bit reservoir size 511, the second fill level 522 may correspond to the overall fill level 102 minus the virtual fill level 512, and the second average-bits-per-frame value 524 may correspond to the overall average-bits-per-frame value 104 minus the virtual average-bits-per-frame value 514.

Figure 6:
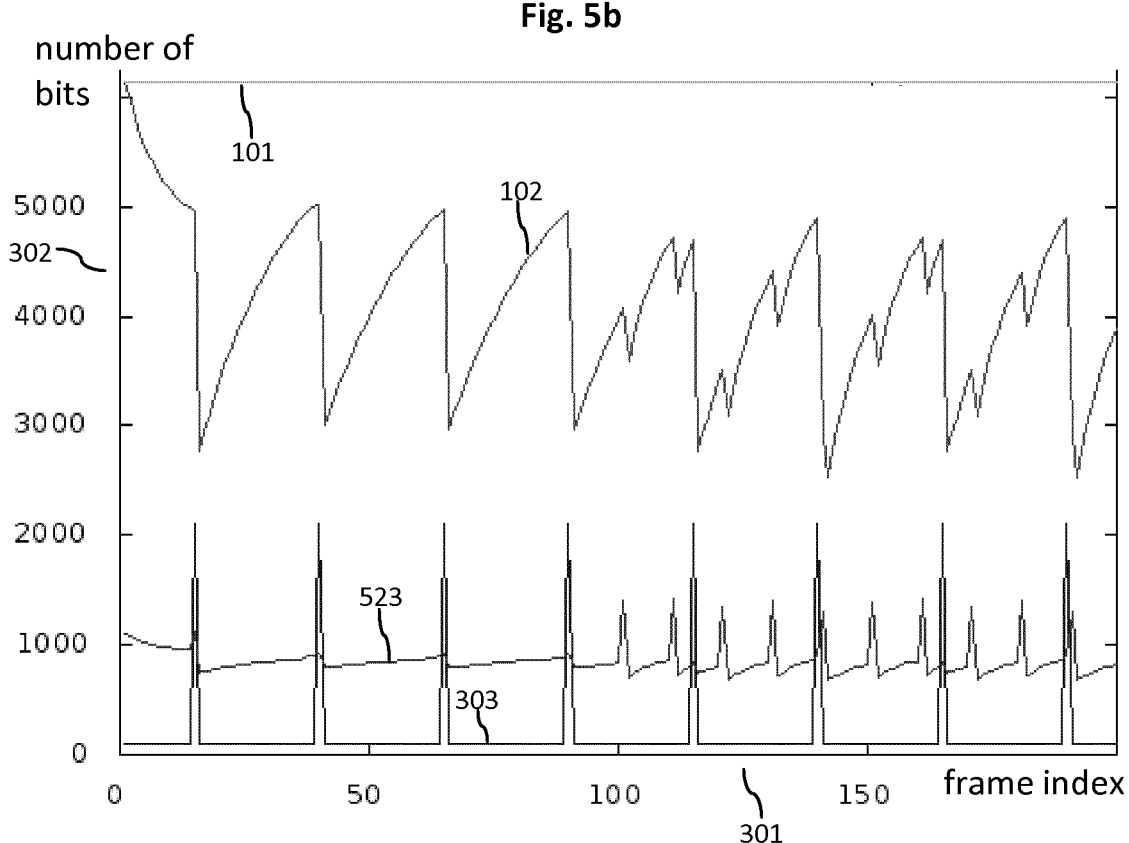
FIG. 6 shows example numbers of granted bits for encoding the frames of a sequence of frames.

The effects of an adaptive virtual bit reservoir model on the bit reservoir control simulation of FIGS. 4a and 4b are shown in FIG. 6. In FIG. 6, the x-axis indicates a sequence number of the frames 301 and the y-axis indicates a number of bits 302. In the illustrated example, the frame index goes from 1 to 200 in integer steps of one. The number of bits goes from 1 to 6000 in integer steps of one. In particular, FIG. 6 shows the fill level 102 of the overall bit reservoir 100, which is obtained by adding up the first fill level 512 and the second fill level 522 of the first and second virtual bit reservoirs 510, 520. Furthermore, FIG. 6 shows the second granted bit value 523 which indicates the number of bits that are granted for encoding of the audio data. It can be seen that the drop of the granted bit value 523, which is caused by the periodic increase of the amount of metadata is damped (compared to the situation shown in FIG. 4b), once the virtual bit reservoir parameters have converged. Overall an (almost) ideal situation as depicted in FIG. 4a is achieved with regards to the encoding of the audio data.

As indicated above, it is typically beneficial to provide a precise initial estimate of the expected first average-bits-per-frame value 514 which is required for encoding the metadata, in order to avoid a disruptive behavior in the start-up phase of the bit allocation scheme. The remaining or residual average-bits-per-frame value may be referred to as a "tuning reference", which indicates the bitrate that is available for encoding the audio data. This "tuning reference" may be set at the beginning of an encoding process and may be used: for determining an appropriate operation mode of the audio encoder; for initializing bitrate dependent parameters of the psychoacoustic model that is used for encoding the audio data; and/or for setting various bitrate-dependent thresholds (for example for block-switching). Hence, the initial parameters of the virtual bit reservoirs 510, 520 may be used for tuning the audio coding scheme.

As a result of this, a substantial mismatch between the expected average bitrate for the metadata and the actual average bitrate for the metadata may lead to a suboptimal tuning of the audio coding scheme and by consequence to a reduced perceptual quality of the encoded audio data. This issue may be overcome by discarding metadata, such that the actual average bitrate for the metadata stays within a predetermined range around the expected average bitrate for the metadata. Alternatively or in addition, one or more tuning parameters of the audio encoding scheme (notably of the psychoacoustic model) may be adapted and/or audio encoding modes may be switched, in dependence of the actual average bitrate for the metadata. In order to avoid frequent toggling between different tunings and/or operation modes of the audio encoder, a hysteresis may be used for the adaption and/or switching decisions.

As indicated above, metadata may be discarded. If the size of the to-be-encoded metadata is too large, at least some of the metadata may be rejected. Typically an encoding scheme which includes one or more preprocessing steps and/or parametric tools and which deals with metadata encompasses a processing delay of several audio frames. As a result of this, a signal aligned metadata encoder or a just-in-time delivery encoder would need to delay the incoming request for writing additional metadata by the processing delay. As a consequence, the bit reservoir control scheme may be confronted with the additional metadata only subsequent to the processing delay. Hence, the decision on whether to process or to discard additional metadata may be taken only subsequent to the processing delay, such that a user is only notified of a potential omission of the additional metadata subsequent to the processing delay. On the other hand, delaying the decision regarding the transmission or the omission of the additional metadata by the processing delay allows for a precise bit allocation process.

Alternatively, the future bit reservoir fill level 512 may be predicted and a decision on whether to accept additional metadata may be taken immediately. Such an "early discarding" process may, however, be suboptimal with regards to bit allocation. The decision on whether to discard additional metadata at encoding time (i.e. subsequent to the processing delay) or immediately may be dependent on the type of metadata.

In order to be able to determine, whether additional metadata has to be discarded or whether the additional metadata can be encoded within a current frame, it may be determined whether the fill level 102 of the bit reservoir 100 is sufficiently high for encoding the additional metadata. A reasonable amount of bits may be reserved for encoding the audio data (for example an amount corresponding to min-BitsAudio). One possibility for determining minBitsAudio is to reserve a number of bits corresponding to the tuning reference which may correspond to the second average-bits-per-frame value 524. The maximum number of bits which will be available for encoding the additional metadata is given as: maxEvoBits=$l_{evo}$+p*(l–$l_{evo}$–minBitsAudio), with l being the current overall bit reservoir fill level 102 and with $l_{evo}$ being the current fill level 512 of the first virtual bit reservoir 510 for the additional metadata. The value l–$l_{evo}$ corresponds to the fill level 522 of the second virtual bit reservoir 520 which is used for encoding the audio data. As such, the value (l–$l_{evo}$–minBitsAudio) indicates the maximum amount of bits that can be "stolen" from the second virtual bit reservoir 520, if minBitsAudio are reserved for encoding the audio data. The percentage parameter p (which may take on values between 0 and 1, for example) may be used as a tuning parameter that determines how aggressively additional metadata is discarded and/or how aggressively available bits from the second virtual bit reservoir 520 may be used for encoding metadata.

If the requested number of bits for additional metadata is higher than maxEvoBits, the additional metadata may be discarded (at least partially). Otherwise, the additional metadata may be transmitted within the bitstream.

The additional metadata may include different metadata portions having different priorities. Depending on the estimated number of bits maxEvoBits that are available for encoding additional metadata, only one or more lower priority metadata portions may be discarded, while one or more higher priority portions may be retained for encoding within the current frame. Optionally, different values for maxEvoBits may be determined for different metadata portions using different values of the percentage parameter p, depending on the priority of the different metadata portions.

As indicated above, metadata may be discarded prior to the time instant at which the encoding of the corresponding audio data is performed. For this purpose, the bit reservoir fill level at the future encoding time instant may be predicted.

It is assumed that additional metadata is to be written into the bitstream in n+1 frames. Due to previous decisions, it is known that $\mu_i$, with i=, ..., n, bits of additional metadata will be written into the bitstream within the next 1 up to n frames. Furthermore, it is known that $f_i$ overflow bits may arise during the encoding of the next 1 up to n frames for avoiding the fill level $l_i$ of the virtual bit reservoir 510 for the additional metadata to overflow. Typically, such overflow bits cannot be used for the encoding of metadata anymore. Furthermore, an average-bits-per-frame value a 514 may be assumed for the additional metadata. Hence, the fill level $l_n$ of the virtual bit reservoir 510 for the additional metadata may be predicted based on the current fullness level $l_0$ as $$l_n = l_0 - \sum_{i=1}^{n}(u_i + f_i) + n \cdot a.$$

The amount of requested bits for encoding additional metadata may be compared with the predicted fill level $l_n$, and a decision may be made on whether the additional metadata can be written into the $(n+1)^{th}$ frame of the bitstream.

As indicated above, the additional metadata may include different metadata portions having different priorities. In particular, the additional metadata may include a high priority metadata portion and a low priority metadata portion. In order to increase the probability that at least some of the additional metadata will be accepted for encoding, it may be beneficial to make separate decisions with regards to high priority metadata and with regards to low priority metadata. The schemes outlined below may be adapted for an increased number of different priority levels accordingly.

In order to guarantee that at least a pre-determined amount of high priority metadata is accepted by the encoder, two restrictions may be enforced on the size of the high priority metadata:
1. a maximum size of high priority metadata per frame $s_H$; and
2. a maximum value for the average bitrate for the high priority metadata, which may be translated into an average-bits-per-frame value $a_H$ for high priority metadata.

With these two constraints a virtual bit reservoir for high priority metadata may be maintained (for example, as part of the first virtual bit reservoir 510 and/or as part of the overall bit reservoir 100). The virtual bit reservoir for high priority metadata may exhibit a fixed constant size given by $s_H$ and an average-bits-per-frame value $a_H$. If the number of high priority metadata within a frame is lower than the average-bits-per-frame value $a_H$ and if the virtual fill level of the virtual bit reservoir is rather high, any excess bits that would lead to an overflow of this virtual bit reservoir may be added to the remaining bit reservoir. Knowing the amount of bits for high priority metadata that have been requested and accepted for the upcoming 1 to n frames, the predicted bit reservoir fill level $l_H$ of the virtual bit reservoir after n-frames delay, which will be available for writing the currently requested high priority metadata may be given by:

$$l_{Hn} = l_{H0} - \sum_{i=1}^{n}(u_{Hi} + f_{Hi}) + n \cdot a_H$$

with $U_{Hi}$ being the amount of accepted, but not yet written high priority metadata for the next n frames, with $f_{Hi}$ being the overflow bits that arise to avoid the bit reservoir level $l_{Hi}$ to exceed the virtual bit reservoir size $s_H$, and with $l_{Ho}$ being the current virtual bit reservoir fill level.

The predicted future virtual bit reservoir fill level $l_{Hn}$ indicates the number of bits which will be available for writing high priority metadata n+1 frames later. If the predicted future virtual bit reservoir fill level $l_{Hn}$ is sufficiently high for encoding the requested amount of high priority metadata, the high priority metadata may be accepted. Otherwise the high priority metadata may be rejected. Different virtual bit reservoirs may be maintained for additional metadata having different levels of priority.

On the other hand, for (relatively) low priority metadata, no further dedicated virtual bit reservoir may be used. It may rather be desirable to provide a compromise between consistent audio quality and the possibility of transmitting a certain amount of (low priority) metadata. As indicated above, the minBitsAudio value may determine the worst-case amount of bits, which should be made available for encoding the audio data of a frame. By way of example, the minBitsAudio value may correspond to the overall average-bits-per-frame value 104 minus the average-bits-per-frame value reserved for high priority metadata, or the minBitsAudio value may correspond to a lower value.

The average-bits-per-frame value $a_L$, which is available for a low priority virtual bit reservoir may be given by $a_L = a_r - \text{minBitsAudio}$, with $a_r$ being the remaining average-bits-per-frame value without the average-bits-per-frame value ax for the high priority metadata.

The overall bit reservoir 100 remaining after subtraction of the virtual bit reservoir 510 for the high priority metadata may be subdivided into one part for low priority metadata and one part for audio data according to the ratio between $a_L$ and $a_r$. If $l_m$ denominates the bit reservoir fill level for all data except for the high priority metadata, a fill level $l_{Ln}$ for a virtual low priority metadata bit reservoir may be given as $$l_{Ln} = \frac{a_L}{a_r} \cdot l_m.$$

A low priority metadata virtual bit reservoir is not only filled up by the average-bits-per-frame value $a_L$, but also by unused bits $f_{Hi}$ from the high priority metadata virtual bit reservoir 510. As a result of this, low priority metadata may be written into a bitstream, even if the maximum possible value for minBitsAudio (that is, $a_r$) is selected, resulting in an average-bits-per-frame value for low priority metadata, $a_L = 0$. Similarly to the high priority bit reservoir, a bit reservoir level $l_{Ln}$ for low priority metadata in n+1 frames may be predicted as:

$$l_{Ln} = l_{L0} - \sum_{i=1}^{n} u_{Li} + \sum_{i=1}^{n} f_{Hi} + n \cdot a_L$$

with $l_{L0}$ being the current bit reservoir fill level for low priority metadata and with $u_{Li}$ being the amount of reserved bits for not yet written low priority metadata for the next n frames.

Using the predicted bit reservoir level $l_{Ln}$ for low priority metadata it may be decided on whether to accept or to reject a current request for writing low priority metadata without waiting for the encoder to process n+1 frames. As such a decision may be made n+1 frames before the low priority metadata is written to the bitstream.

The future high priority virtual bit reservoir fill level $l_{Hn}$ 512 and the future low priority virtual bit reservoir fill level $l_{Ln}$ may be determined as outlined above. In a first step, the requested amount of high priority metadata may be compared with the predicted high priority virtual bit reservoir fill level $l_{Hn}$ 512. If the requested amount of high priority metadata is higher than $l_{Hn}$, it may be verified whether the requested amount of high priority metadata is smaller than the combined number of available bits from the high and low priority metadata virtual bit reservoir fill levels $l_{Hn} + l_{Ln}$. As such, the high priority metadata may take bits from the low priority bit reservoir. A decision regarding the requested low priority metadata may then be made based on the remaining amount of bits within the low priority bit reservoir.

Hence, for being able to reach an early decision on the acceptance of requested metadata, a predicted fill level may be determined for virtual bit reservoirs for high and low priority metadata. To derive these fill levels the history of the amount of metadata $u_{Hi}$ and $u_{Li}$, which has been accepted to be written within the next n frames, is used.

Figure 7:
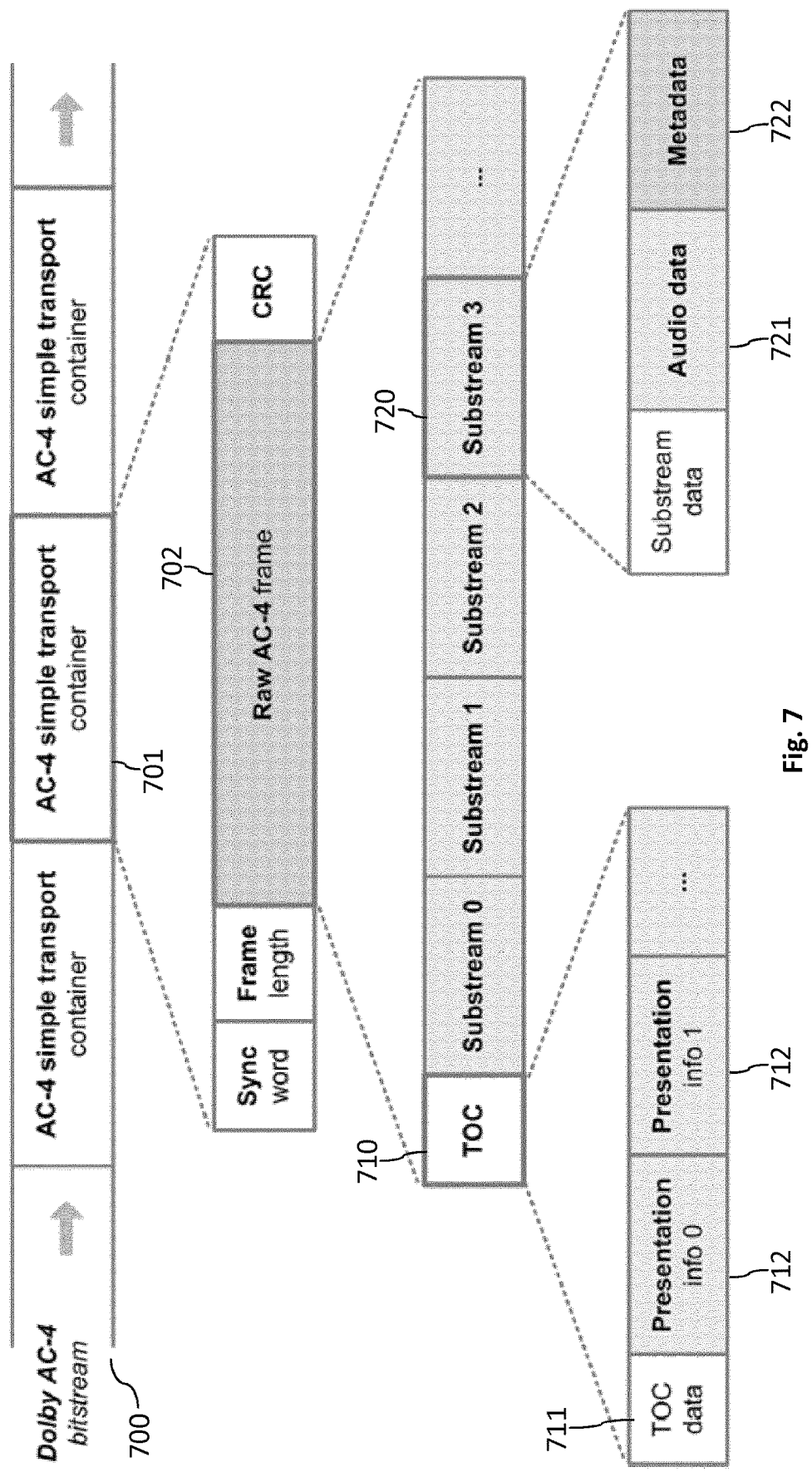
FIG. 7 shows an example sequence of AC-4 frames.

FIG. 7 illustrates an audio program which may be transported in a bitstream 700 which includes a sequence of containers 701. Each container 701 may include data of the audio program for a particular frame of the audio program. A particular frame of the audio program may correspond to a particular temporal segment of the audio program (e.g. 20 milliseconds of the audio program). Hence, each container 701 of the sequence of containers 701 may carry the data for a frame of a sequence of frames of the audio program. The data for a frame may be included within a frame entity 702 of a container 701. The frame entity may be identified using a syntax element of the bitstream 700.

A bitstream 700 may carry a plurality of substreams, wherein each substream may include a bed of speaker channels or an object channel. As such, a frame entity 702 may include a plurality of substream entities 720 for a corresponding plurality of substreams of the audio program. Furthermore, a frame entity 702 may include a presentation section 710 (also referred to as a Table of Content, TOC, section). The presentation section 710 may include TOC data 711 which may indicate e.g. a number of presentations included within the presentation section 710. A presentation may define a certain combination of substreams for an individual audio program that can be composed from the overall audio program. Furthermore, the presentation section 710 may include one or more presentation entities 712 which carry data for defining one or more presentations, respectively. A substream entity 720 may include a content sub-entity 721 for carrying the audio data of a frame of a substream. Furthermore, a substream entity 720 may include a metadata sub-entity 722 for carrying the corresponding metadata of the frame of the substream.

The above mentioned bit allocation scheme may be applied to an individual substream of an audio program. In particular, the amount of bits to be written within a content sub-entity 721 and a metadata sub-entity 722 of a substream entity 720 for a substream may be determined using the bit allocation scheme described in the present document. As such, bit allocation may be achieved individually for each substream of the overall bitstream 700.

The overall bitstream 700 typically includes shared metadata which is shared by a plurality of different substreams. The shared metadata may be subdivided into a plurality of portions (using a certain distribution ratio) and may then be distributed to the encoders for the individual substreams. The attributed portion of shared metadata may be handled by the bit allocation process for an individual substream as additional metadata. The shared metadata may then be inserted into the multiplexed bitstream 700. Alternatively, the shared metadata may be assigned to a single substream, notably if the additional average-bits-per-frame value for the shared metadata is known upfront. The additional average-bits-per-frame value may then be accounted for during the setup of the bit reservoir 100 and the virtual bit reservoir 510.

Figure 8:
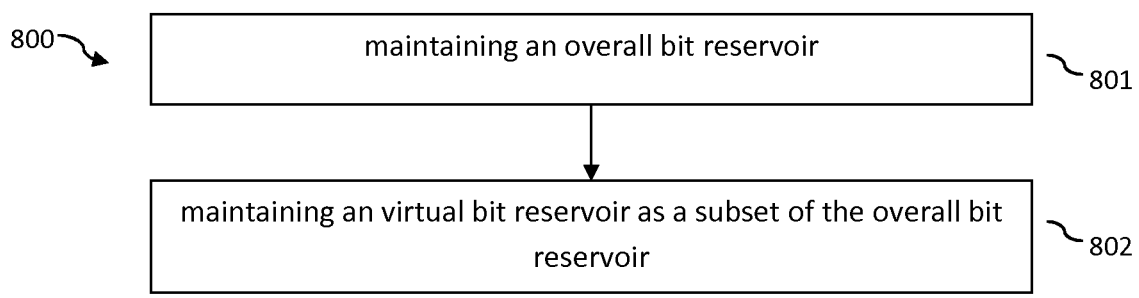
FIG. 8 shows a flow chart of an example method for allocating bits to a frame of a sequence of frames.

FIG. 8 shows a flow chart of an example method 800 for allocating bits to a frame 301 of a sequence of frames 301 to yield a bitstream 700 having a constant average bitrate.

The frame 301 includes audio data and metadata. The method 800 includes maintaining 801 an overall bit reservoir 100. Furthermore, the method 800 includes maintaining 802 a virtual bit reservoir 510 being a subset of the overall bit reservoir 100. The bit reservoirs 100, 510 may be maintained such that bits for the metadata of the frame 301 are allocated from the virtual bit reservoir 510 and such that bits for the audio data of the frame 301 are allocated from the overall bit reservoir 100.

In the present document, a control scheme has been described which allows to decouple the effects of temporal metadata fluctuations from the bit reservoir control for audio data in an efficient and consistent manner.

In particular an improved bit reservoir control scheme is described which takes into account the temporal varying amount of additional metadata, parametric coding tools and other side information data. An overall bit reservoir 100 is split up into two or more virtual bit reservoirs 511, each bit reservoir have dedicated control mechanisms. The virtual bit reservoir properties may be adapted over time to changing metadata characteristics. Bits may be exchanged between different virtual bit reservoirs, notably for avoiding a waste of superfluous bits and/or for handling peak demands (notably for metadata). Furthermore, a dynamic adaptation of audio encoder tuning parameters and/or codec modes to a changing available bitrate for the audio data may be performed in order to increase the quality of the encoded audio data.

A method that is able to successively discard additional metadata with different priorities is described, in order to maintain a pre-determined level of audio quality. By using a virtual bit reservoir 510 for metadata having appropriate characteristics, it may be ensured that high priority metadata can be written into a bitstream 700 as long as the high priority metadata fulfills the requirements of not exceeding an average bitrate (as defined by the virtual average-bits-per-frame value 514) and an absolute peak value per frame (as defined by the virtual reservoir size 511).

Furthermore, a scheme for predicting a future number of available bits within a metadata virtual bit reservoir 510 is described. As a result, it may be decided on the acceptance or rejection of metadata as soon as the metadata is fed into the encoder, without the need to wait several frames of encoder processing delay (when the metadata is actually written into the bitstream 700).

The methods and systems described in the present document may be implemented as software, firmware and/or hardware. Certain components may e.g. be implemented as software running on a digital signal processor or microprocessor. Other components may e.g. be implemented as hardware and or as application specific integrated circuits. The signals encountered in the described methods and systems may be stored on media such as random access memory or optical storage media. They may be transferred via networks, such as radio networks, satellite networks, wireless networks or wireline networks, e.g. the Internet. Typical devices making use of the methods and systems described in the present document are portable electronic devices or other consumer equipment which are used to store and/or render audio signals.

Various aspects of the present invention may be appreciated from the following enumerated example embodiments (EEEs):

EEE 1. A method (800) for allocating bits to a frame (301) of a sequence of frames (301) to yield a bitstream having a constant average bitrate; wherein the frame (301) comprises audio data and metadata; wherein the method (800) comprises,
    maintaining (801) an overall bit reservoir (100); and
    maintaining (802) a virtual bit reservoir (510) being a subset of the overall bit reservoir (100), such that bits for the metadata of the frame (301) are allocated from the virtual bit reservoir (510) and such that bits for the audio data of the frame (301) are allocated from the overall bit reservoir (100).

EEE 2. The method (800) of EEE 1, wherein maintaining (801) the overall bit reservoir (100) comprises, for the frame (301) of the sequence of frames (301),
    increasing an overall fill level (102) of the overall bit reservoir (100) by an overall average-bits-per-frame value (104); wherein the overall average-bits-per-frame value (104) is dependent on the constant average bitrate; and
    granting available bits from the overall bit reservoir (100) for the audio data of the frame (301) in accordance with the overall fill level (102) of the overall bit reservoir (100).

EEE 3. The method (800) of EEE 2, wherein maintaining (802) the virtual bit reservoir (510) comprises, for the frame (301) of the sequence of frames (301),
    increasing a virtual fill level (512) of the virtual bit reservoir (510) by a virtual average-bits-per-frame value (514) being a portion of the overall average-bits-per-frame value (104); and
    granting available bits from the virtual bit reservoir (510) for the metadata of the frame in accordance with the virtual fill level (512) of the virtual bit reservoir (510).

EEE 4. The method (800) of EEE 3, wherein the method (800) comprises
    determining whether the virtual fill level (512) is smaller than or equal to a low fill level threshold, subsequent to granting available bits for the metadata of the frame; and
    if it is determined that the virtual fill level (512) is smaller than or equal to the low fill level threshold, increasing the virtual average-bits-per-frame value (514).

EEE 5. The method (800) of any of EEEs 3 to 4, wherein the method (800) comprises
    determining whether the virtual fill level (512) is greater than or equal to a high fill level threshold, subsequent to increasing the virtual fill level (512) of the virtual bit reservoir (510); and
    if it is determined that the virtual fill level (512) is greater than or equal to the high fill level threshold, decreasing the virtual average-bits-per-frame value (514).

EEE 6. The method (800) of any of EEEs 3 to 5, wherein
    the virtual bit reservoir (510) exhibits a virtual reservoir size (511) which is indicative of a maximum number of bits that can be granted for the metadata of a single frame (301) of the sequence of frames (301);
    the method (800) comprises determining whether the virtual fill level (512) would be greater than the virtual reservoir size (511), subsequent to increasing the virtual fill level (512) of the virtual bit reservoir (510) by the virtual average-bits-per-frame value (514); and
    the method (800) comprises, if it is determined that the virtual fill level (512) would be greater than the virtual reservoir size (511), setting the virtual fill level (512) to the virtual reservoir size (511).

EEE 7. The method (800) of any of EEEs 2 to 6, wherein granting available bits from the overall bit reservoir (100) comprises,
    determining a bit allocation control function (205, 206, 207), which indicates a granted bits value (203) of bits from the overall bit reservoir (100) to be granted for the audio data of the frame as a function of the overall fill level (102); and
    granting available bits from the overall bit reservoir (100) for the audio data of the frame using the bit allocation control function (205, 206, 207).

EEE 8. The method (800) of EEE 7, wherein the bit allocation control function (205, 206, 207) is dependent on a degree of encoding difficulty of the audio data of the frame.

EEE 9. The method (800) of any of EEEs 3 to 8, wherein granting available bits from the virtual bit reservoir (511) comprises,
    determining whether a number of bits required for the metadata of the frame (301) is higher than a bit threshold; wherein the bit threshold is dependent on the virtual fill level (512); and
    if the number of bits required for the metadata is higher than the bit threshold, discarding at least some of the metadata of the frame (301).

EEE 10. The method (800) of any of EEEs 3 to 8, wherein
    the frame (301) of the sequence of frames (301) is a current frame (301) received at a first time instant;
    the method (800) comprises predicting a virtual fill level (512) of the virtual bit reservoir (510) at a second time instant, at which the current frame (301) is to be encoded; wherein the second time instant is subsequent to the first time instant; and
    the method (800) comprises determining, at the first time instant, whether a number of bits required for the metadata of the current frame (301) is higher than a bit threshold; wherein the bit threshold is dependent on the predicted virtual fill level (512) at the second time instant.

EEE 11. The method (800) of EEE 10, wherein
    a time interval between the first time instant and the second time instant corresponds to n frames, with n being equal to or greater than 1;
    the method (800) comprises determining a number of reserved bits which is to be used for encoding the metadata of the n frames (301) preceding the current frame (301);
    the method (800) comprises determining the virtual fill level (512) at the first time instant; and
    the virtual fill level (512) at the second time instant is predicted based on the virtual fill level (512) at the first time instant and based on the number of reserved bits.

EEE 12. The method (800) of EEE 11, wherein
    the method (800) comprises determining a number of overflow bits which arise within the virtual bit reservoir (510) for encoding the metadata of the n frames (301) preceding the current frame (301); and
    the virtual fill level (512) at the second time instant is predicted based on the number of overflow bits.

EEE 13. The method (800) of EEE 12, wherein the virtual fill level (512) at the second time instant is predicted as $l_n = l_0 - \Sigma_{i=1}^{n}(u_i + f_i) + n \cdot a$, with $l_0$ being the virtual fill level (512) at the first time instant, with $u_i$ being the number of reserved bits for the $i^{th}$ frame (301) preceding the current frame (301), with $f_i$ being the number of overflow bits for the $i^{th}$ frame (301) preceding the current frame (301), with i=1, ..., n, and with a being the virtual average-bits-per-frame value (514).

EEE 14. The method (800) of any of EEEs 12 to 13, wherein
  bits from the virtual bit reservoir (510) are used to encode high priority metadata; and
  the number of overflow bits which arise within the virtual bit reservoir (510) for encoding the high priority metadata of the n frames (301) preceding the current frame (301) is used for encoding low priority metadata.

EEE 15. The method (800) of any of EEEs 9 to 14, wherein
  the method (800) comprises, classifying the metadata into high priority metadata and low priority metadata;
  low priority metadata is discarded, if the number of bits required for encoding the metadata is higher than the bit threshold; and
  high priority metadata is encoded, if the number of bits required for encoding the high priority metadata is lower than or equal to the bit threshold.

EEE 16. The method (800) of any of EEEs 9 to 15, wherein the bit threshold
  corresponds to the virtual fill level (512); or
  corresponds to $l_{evo}+p*(l-l_{evo}-minBitsAudio)$, wherein $l_{evo}$ is the virtual fill level (512), l is the overall fill level (102), minBitsAudio number of is reserved bits for encoding the audio data, and p is a parameter between 0 and 1.

EEE 17. The method (800) of any previous EEE, wherein
  the audio data of a frame (301) of the sequence of frames (301) is encoded using bits from a residual bit reservoir being the complement of the virtual bit reservoir (510) within the overall bit reservoir (100); and
  the residual bit reservoir exhibits a residual fill level (522) given by the overall fill level (102) minus the virtual fill level (512).

EEE 18. The method (800) of EEE 17, wherein
  the audio data of a frame (301) of the sequence of frames (301) is encoded using bits from a second virtual bit reservoir (520) being a subset of the residual bit reservoir; and
  the second virtual bit reservoir (520) exhibits a second virtual fill level (522) being a portion of the residual fill level.

EEE 19. The method (800) of any previous EEE, wherein the method (800) comprises maintaining a plurality of virtual bit reservoirs (510, 520) as mutually disjoint subsets of the overall bit reservoir (100) for a plurality of different types of metadata.

EEE 20. The method (800) of any previous EEE, wherein
  the overall bit reservoir (100) exhibits an overall reservoir size (101) which is indicative of a maximum number of bits that can be allocated to a frame (301) of the sequence of frames (301);
  an overall average-bits-per-frame value (104) is indicative of an average number of bits that can be allocated to a frame (301) of the sequence of frames (301) to achieve the constant average bitrate; and
  the overall reservoir size (101) is N times the overall average-bits-per-frame value (104), with N being greater than one.

EEE 21. The method (800) of any previous EEE, wherein
  the virtual bit reservoir (510) exhibits a virtual reservoir size (511) which is indicative of a maximum number of bits that can be allocated to the metadata of a frame (301) of the sequence of frames (301);
  a virtual average-bits-per-frame value (514) is indicative of an average number of bits that can be allocated to the metadata of a frame (301) of the sequence of frames (301); and
  the virtual reservoir size (511) is M times the virtual average-bits-per-frame value (514), with M being greater than one.

EEE 22. The method (800) of any previous EEE, wherein
  the overall bit reservoir (100) is refilled with an overall average-bits-per-frame value (104) for every frame (301) of the sequence of frames (301);
  the average-bits-per-frame value (104) is dependent on the constant average bitrate;
  the virtual bit reservoir (511) is refilled with a virtual average-bits-per-frame value (514) for every frame (301) of the sequence of frames (301), the virtual average-bits-per-frame value (514) being a portion of the overall average-bits-per-frame value (104); and
  the method (800) comprises setting a parameter of an audio encoder for encoding the audio data of the frame (301) of the sequence of frames (301) in dependence of the virtual average-bits-per-frame value (514).

EEE 23. The method (800) of EEE 22, wherein the parameter of the audio encoder is set in dependence of a residual average-bits-per-frame value which is given by the overall average-bits-per-frame value (104) minus the virtual average-bits-per-frame value (514).

EEE 24. The method (800) of any of EEEs 22 to 23, wherein the parameter of the audio encoder comprises one or more of: a bitrate dependent parameter of a psychoacoustic model used by the audio encoder; and/or a bitrate dependent threshold of the audio encoder.

EEE 25. The method (800) of any previous EEEs, wherein
  the metadata is encoded using only bits from the virtual bit reservoir (510); and/or
  the audio data is encoded using only bits from a residual bit reservoir being the complement of the virtual bit reservoir (510) within the overall bit reservoir (100); and/or
  the residual bit reservoir is maintained separately from the virtual bit reservoir (510); and/or
  an overflow bit from the virtual bit reservoir (510) is made available within the residual bit reservoir; and/or
  an overflow bit from the residual bit reservoir is made available within the virtual bit reservoir (510).

EEE 26. A method for encoding a frame (301) of a sequence of frames (301) into a bitstream having a constant average bitrate; wherein the frame (301) comprises audio data and metadata; wherein the method comprises,
  determining a granted number of audio bits for the audio data and a number of metadata bits for the metadata using the method (800) according to any previous EEEs;
  encoding the metadata of the frame (301) using the granted number of metadata bits; and
  encoding the audio data of the frame (301) using the granted number of audio bits.

EEE 27. The method of EEE 26, wherein
  the frame (301) of the sequence of frames (301) comprises a plurality of substream frames for a plurality of substreams, respectively;
  a substream frame comprises substream audio data and substream metadata; and
  the method comprises determining a granted number of audio bits for the substream audio data and a number of metadata bits for the substream metadata using the method (800) according to any of EEEs 1 to 25.

EEE 28. The method of EEE 27, wherein
the frame (301) of the sequence of frames (301) comprises joint metadata for the plurality of substreams; and
the method comprises distributing the joint metadata as substream metadata to at least one of the plurality of substreams.

EEE 29. A system for allocating bits to a frame (301) of a sequence of frames (301) to yield a bitstream having a constant average bitrate; wherein the frame (301) comprises audio data and metadata; wherein the system comprises a processor which is configured to maintain an overall bit reservoir (100) and to maintain a virtual bit reservoir (510) being a subset of the overall bit reservoir (100), such that bits for the metadata of the frame (301) are allocated from the virtual bit reservoir (510) and such that bits for the audio data of the frame (301) are allocated from the overall bit reservoir (100).

EEE 30. A system for encoding a frame (301) of a sequence of frames (301) into a bitstream having a constant average bitrate; wherein the frame (301) comprises audio data and metadata; wherein the system comprises a processor which is configured to
determine a granted number of audio bits for the audio data and a number of metadata bits for the metadata using the method (800) according to any of EEEs 1 to 25;
encode the metadata of the frame (301) using the granted number of metadata bits; and
encode the audio data of the frame (301) using the granted number of audio bits.

The invention claimed is:

1. A method for allocating bits to a frame of a sequence of frames to yield a bitstream having a constant average bitrate; wherein the frame comprises audio data and metadata; wherein the method comprises,
maintaining an overall bit reservoir;
maintaining a virtual bit reservoir being a subset of the overall bit reservoir;
allocating bits for the metadata of the frame from the virtual bit reservoir; and
allocating bits for the audio data of the frame from the overall bit reservoir.

2. The method of claim 1, wherein maintaining the overall bit reservoir comprises, for the frame of the sequence of frames,
increasing an overall fill level of the overall bit reservoir by an overall average-bits-per-frame value; wherein the overall average-bits-per-frame value is dependent on the constant average bitrate; and
granting available bits from the overall bit reservoir for the audio data of the frame in accordance with the overall fill level of the overall bit reservoir.

3. The method of claim 2, wherein maintaining the virtual bit reservoir comprises, for the frame of the sequence of frames,
increasing a virtual fill level of the virtual bit reservoir by a virtual average-bits-per-frame value being a portion of the overall average-bits-per-frame value; and
granting available bits from the virtual bit reservoir for the metadata of the frame in accordance with the virtual fill level of the virtual bit reservoir.

4. The method of claim 3, wherein the method comprises
determining whether the virtual fill level is smaller than or equal to a low fill level threshold, subsequent to granting available bits for the metadata of the frame; and
if it is determined that the virtual fill level is smaller than or equal to the low fill level threshold, increasing the virtual average-bits-per-frame value.

5. The method of claim 3, wherein the method comprises
determining whether the virtual fill level is greater than or equal to a high fill level threshold, subsequent to increasing the virtual fill level of the virtual bit reservoir; and
if it is determined that the virtual fill level is greater than or equal to the high fill level threshold, decreasing the virtual average-bits-per-frame value.

6. The method of claim 3, wherein
the virtual bit reservoir exhibits a virtual reservoir size which is indicative of a maximum number of bits that can be granted for the metadata of a single frame of the sequence of frames;
the method comprises determining whether the virtual fill level would be greater than the virtual reservoir size, subsequent to increasing the virtual fill level of the virtual bit reservoir by the virtual average-bits-per-frame value; and
the method comprises, if it is determined that the virtual fill level would be greater than the virtual reservoir size, setting the virtual fill level to the virtual reservoir size.

7. The method of claim 1, wherein—the overall bit reservoir is refilled with an overall average-bits-per-frame value for every frame of the sequence of frames;—the average-bits-per-frame value is dependent on the constant average bitrate;—the virtual bit reservoir is refilled with a virtual average-bits-per-frame value for every frame of the sequence of frames, the virtual average-bits-per-frame value being a portion of the overall average-bits-per-frame value; and—the method comprises setting a parameter of an audio encoder for encoding the audio data of the frame of the sequence of frames in dependence of the virtual average-bits-per-frame value.

8. The method of claim 7, wherein the parameter of the audio encoder is set in dependence of a residual average-bits-per-frame value which is given by the overall average-bits-per-frame value minus the virtual average-bits-per-frame value.

9. The method of claim 7, wherein the parameter of the audio encoder comprises one or more of: a bitrate dependent parameter of a psychoacoustic model used by the audio encoder; and/or a bitrate dependent threshold of the audio encoder.

10. A system for allocating bits to a frame of a sequence of frames to yield a bitstream having a constant average bitrate;
wherein the frame comprises audio data and metadata;
wherein the system comprises a processor which is configured to maintain an overall bit reservoir and to maintain a virtual bit reservoir being a subset of the overall bit reservoir,
the processor is further configured to allocate bits for the metadata of the frame from the virtual bit reservoir, and allocate bits for the audio data of the frame from the overall bit reservoir.

* * * * *